United States Patent
Pang et al.

(10) Patent No.: US 11,140,731 B2
(45) Date of Patent: Oct. 5, 2021

(54) DATA TRANSMISSION METHOD, COMMUNICATION DEVICE, AND DATA TRANSMISSION SYSTEM

(71) Applicant: HUAWEI TECHNOLOGIES CO., LTD., Guangdong (CN)

(72) Inventors: Jiyong Pang, Shanghai (CN); Hongjia Su, Shanghai (CN); Zhengzheng Xiang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 62 days.

(21) Appl. No.: 16/530,471

(22) Filed: Aug. 2, 2019

(65) Prior Publication Data

US 2019/0357286 A1    Nov. 21, 2019

Related U.S. Application Data

(63) Continuation of application No. PCT/CN2018/077104, filed on Feb. 24, 2018.

(30) Foreign Application Priority Data

Mar. 20, 2017  (CN) .......................... 201710166658.3

(51) Int. Cl.
  *H04W 40/22*   (2009.01)
  *H04W 88/04*   (2009.01)
  (Continued)

(52) U.S. Cl.
  CPC ............... *H04W 76/14* (2018.02); *H04L 1/06* (2013.01); *H04W 40/22* (2013.01); *H04W 88/04* (2013.01)

(58) Field of Classification Search
  CPC ..... H04W 40/22; H04W 76/14; H04W 88/04; H04L 1/06
  See application file for complete search history.

(56) References Cited

U.S. PATENT DOCUMENTS

| | | |
|---|---|---|
| 2005/0014464 A1 | 1/2005 | Larsson |
| 2014/0177456 A1 | 6/2014 | Boudreau et al. |
| 2015/0163021 A1* | 6/2015 | Braithwaite ....... H04B 7/15507 370/315 |

FOREIGN PATENT DOCUMENTS

| | | |
|---|---|---|
| CN | 1826780 A | 8/2006 |
| CN | 101242368 A | 8/2008 |

(Continued)

*Primary Examiner* — Brian P Cox
(74) *Attorney, Agent, or Firm* — Womble Bond Dickinson (US) LLP

(57) ABSTRACT

A data transmission method, a communication device, and a data transmission system are disclosed. The method includes: determining to-be-transmitted data that needs to be sent to a network side device; before an initial transmission moment of transmitting the to-be-transmitted data to the network side device arrives, sending the to-be-transmitted data to a coordinating device; receiving the to-be-transmitted data sent by the target device; obtaining transmission parameter information; and when the initial transmission moment corresponding to the to-be-transmitted data arrives, sending the received to-be-transmitted data to the network side device based on the transmission parameter information. Therefore, when the target device needs to send the to-be-transmitted data to the network side device, the coordinating device may help the target device perform initial transmission of the to-be-transmitted data, thereby increasing a success probability of initial transmission, and further improving link reliability.

20 Claims, 6 Drawing Sheets

(51) Int. Cl.
*H04L 1/06* (2006.01)
*H04W 76/14* (2018.01)

(56) References Cited

FOREIGN PATENT DOCUMENTS

| | | | |
|---|---|---|---|
| CN | 101471754 | A | 7/2009 |
| CN | 101951309 | A | 1/2011 |
| CN | 102263626 | A | 11/2011 |
| CN | 105763298 | A | 7/2016 |
| CN | 105900351 | A | 8/2016 |
| WO | 2010/028684 | A1 | 3/2010 |
| WO | 2010/123256 | A2 | 10/2010 |

* cited by examiner

DATA TRANSMISSION METHOD, COMMUNICATION DEVICE, AND DATA TRANSMISSION SYSTEM

CROSS-REFERENCE TO RELATED APPLICATIONS

This application is a continuation of International Application No. PCT/CN2018/077104, filed on Feb. 24, 2018, which claims priority to Chinese Patent Application No. 201710166658.3, filed on Mar. 20, 2017. The disclosures of the aforementioned applications are hereby incorporated by reference in their entireties.

TECHNICAL FIELD

The present disclosure relates to the communications field, and more specifically, to a data transmission method, a communication device, and a data transmission system.

BACKGROUND

In a relay-assisted uplink transmission technology in 3GPP LTE-A, a relay node (RN) may listen to communication between an eNodeB eNB and UE. When initial transmission of uplink data of the UE fails, both the RN and the UE may retransmit, to the eNodeB at a retransmission moment, the uplink data whose initial transmission fails. In this way, received signal power on an eNodeB side is increased. The RN needs to first listen to the uplink data initially transmitted by the UE, and helps the UE perform retransmission when initial transmission of the UE fails after the RN successfully detects, through listening, the uplink data initially transmitted by the UE. Therefore, in the foregoing technology, only a success probability of retransmission is increased, but a success probability of initial transmission of the UE is not increased.

SUMMARY

In view of this, this application provides a data transmission method, a communication device, and a data transmission system, to increase a success probability of initial transmission of data and improve link reliability.

According to a first aspect, a data transmission method is provided, where the method includes: obtaining, by a coordinating device, transmission parameter information, where the transmission parameter information indicates a parameter that needs to be used by a target device to send to-be-transmitted data to a network side device; receiving, by the coordinating device, the to-be-transmitted data sent by the target device; and when an initial transmission moment corresponding to the to-be-transmitted data arrives, sending, by the coordinating device, the to-be-transmitted data to the network side device based on the transmission parameter information. In this method, the coordinating device may help the target device perform initial transmission of data, thereby increasing a success probability of initial transmission, and further improving link reliability.

According to the first aspect, in a first possible implementation of the data transmission method, the coordinating device listens to information sent by the network side device to the target device, to obtain the transmission parameter information; or the coordinating device receives the transmission parameter information sent by the target device.

According to the first aspect or the first possible implementation of the first aspect, in a second possible implementation of the data transmission method, the coordinating device obtains third indication information that is fed back by the network side device for the to-be-transmitted data, where the third indication information indicates that the network side device fails to receive the to-be-transmitted data. When a retransmission moment corresponding to the to-be-transmitted data arrives, the coordinating device retransmits the received to-be-transmitted data to the network side device. In this implementation, in addition to helping the target device complete initial transmission, the coordinating device may further help the target device perform retransmission, thereby further increasing a success probability of transmitting the to-be-transmitted data to the network side device by the target device, and further improving link reliability.

According to a second aspect, a data transmission method is provided, where the method includes: determining, by a target device, to-be-transmitted data that needs to be sent to a network side device; and before an initial transmission moment at which the target device sends the to-be-transmitted data to the network side device arrives, sending, by the target device, the to-be-transmitted data to a coordinating device. In this method, when the initial transmission moment arrives, the coordinating device may help the target device send the to-be-transmitted data to the network side device, thereby increasing a success probability of initial transmission, and further improving link reliability.

According to the second aspect, in a first possible implementation of the data transmission method, when the initial transmission moment arrives, the target device sends the to-be-transmitted data to the network side device based on transmission parameter information, where the transmission parameter information indicates a parameter that needs to be used by the target device to send the to-be-transmitted data to the network side device. Both the target device and the coordinating device upload the to-be-transmitted data at the initial transmission moment, and the network side device actually receives both the to-be-transmitted data sent by the target device and the to-be-transmitted data sent by the coordinating device, thereby enhancing strength of the to-be-transmitted data received by the network side device. In this way, a success probability of receiving the to-be-transmitted data by the network side device can be further increased, so that link reliability can be further improved.

According to the second aspect or the first possible implementation of the second aspect, in a second possible implementation of the data transmission method, the target device receives the transmission parameter information sent by the network side device, or the target device determines the transmission parameter information.

According to any one of the second aspect or the implementations of the second aspect, in a third possible implementation of the data transmission method, before the initial transmission moment arrives, the target device sends the transmission parameter information to the coordinating device. Therefore, the coordinating device does not need to continuously listen to the transmission parameter information sent by the network side device on a downlink, thereby reducing listening overheads of the coordinating device.

According to any one of the first aspect, the implementations of the first aspect, the second aspect, or the implementations of the second aspect, in another possible implementation, the target device may send the to-be-transmitted data to the coordinating device through a D2D link between the target device and the coordinating device.

According to any one of the foregoing implementations, in another possible implementation, the coordinating device feeds back first indication information to the target device. Before the initial transmission moment arrives, if the target device receives no first indication information fed back by the coordinating device, the target device retransmits the to-be-transmitted data to the coordinating device, and sends the transmission parameter information to the coordinating device. The first indication information indicates that the coordinating device successfully obtains the transmission parameter information and the to-be-transmitted data. If the target device receives no first indication information fed back by any coordinating device, it indicates that no coordinating device successfully obtains the transmission parameter information and the to-be-transmitted data at present. Therefore, the target device may perform retransmission, to increase a success probability of receiving the to-be-transmitted data and the transmission parameter information by the coordinating device.

According to any one of the foregoing implementations, in another possible implementation, the target device sends second indication information to the coordinating device, or the coordinating device receives second indication information sent by the target device or the network side device, where the second indication information indicates that the target device requests the coordinating device to send the to-be-transmitted data to the network side device.

According to a third aspect, a communication device is provided, where the communication device is a device that helps another device send to-be-transmitted data, the communication device may be referred to as a coordinating device, and the another device may be referred to as a target device. The communication device has a function for implementing the operation of the coordinating device in the foregoing method designs. The function may be implemented by hardware, and the hardware includes a transceiver and a processor. Alternatively, the function may be implemented by executing corresponding software by hardware. The hardware or software includes one or more modules corresponding to the foregoing function. The module may be software and/or hardware. In an implementation, the communication device includes: an obtaining module, configured to obtain transmission parameter information, where the transmission parameter information indicates a parameter that needs to be used by a target device to send to-be-transmitted data to a network side device; a receiving module, configured to receive the to-be-transmitted data sent by the target device; and a sending module, configured to send the received to-be-transmitted data to the network side device based on the transmission parameter information when an initial transmission moment corresponding to the to-be-transmitted data arrives. Therefore, when the initial transmission moment arrives, the communication device may send the to-be-transmitted data to the network side device based on the transmission parameter information, to help the target device perform initial transmission of the data, thereby increasing a success probability of initial transmission, and further improving link reliability.

According to the third aspect, in a first possible implementation of the communication device, the obtaining module is specifically configured to listen to information sent by the network side device to the target device, to obtain the transmission parameter information; or the obtaining module is specifically configured to receive the transmission parameter information sent by the target device.

According to the third aspect or the first possible implementation of the third aspect, in a second possible implementation of the communication device, the receiving module is specifically configured to receive, through a D2D link between the communication device and the target device, the to-be-transmitted data sent by the target device.

According to any one of the third aspect or the implementations of the third aspect, in a third possible implementation of the communication device, the sending module is further configured to feed back first indication information to the target device, where the first indication information indicates that the communication device successfully obtains the transmission parameter information and the to-be-transmitted data. If the target device receives no first indication information fed back by any coordinating device, it indicates that no coordinating device successfully obtains the transmission parameter information and the to-be-transmitted data at present. Therefore, the target device may perform retransmission, to increase a success probability of receiving the to-be-transmitted data and the transmission parameter information by the coordinating device.

According to any one of the third aspect or the implementations of the third aspect, in a fourth possible implementation of the communication device, the receiving module is further configured to receive second indication information sent by the target device or the network side device, where the second indication information indicates that the target device requests the communication device to send the to-be-transmitted data to the network side device.

According to a fourth aspect, a communication device is provided, where the communication device is a device that needs to request another device to help send to-be-transmitted data to a network side device, the communication device may be referred to as a target device, and the another device may be referred to as a coordinating device. The communication device has a function for implementing the operation of the target device in the foregoing method designs. The function may be implemented by hardware, and the hardware includes a transceiver and a processor. Alternatively, the function may be implemented by executing corresponding software by hardware. The hardware or software includes one or more modules corresponding to the foregoing function. The module may be software and/or hardware. In an implementation, the communication device includes: a determining module, configured to determine to-be-transmitted data that needs to be sent to a network side device; and a sending module, configured to send the to-be-transmitted data to a coordinating device before an initial transmission moment of sending the to-be-transmitted data to the network side device arrives. Therefore, when the initial transmission moment arrives, the coordinating device may send the to-be-transmitted data to the network side device based on transmission parameter information, to help the communication device perform initial transmission of the data, thereby increasing a success probability of initial transmission, and further improving link reliability.

According to the fourth aspect, in a first possible implementation of the communication device, the sending module is further configured to send the to-be-transmitted data to the network side device based on transmission parameter information when the initial transmission moment arrives, where the transmission parameter information indicates a parameter that needs to be used by the communication device to send the to-be-transmitted data to the network side device. In this implementation, both the communication device and the coordinating device may upload the to-be-transmitted data at the initial transmission moment, and the network side device actually receives both the to-be-transmitted data sent by the target device and the to-be-transmitted data sent by the coordinating device, thereby enhancing strength of the to-be-transmitted data received by the network side device.

In this way, a success probability of receiving the to-be-transmitted data by the network side device can be further increased, so that link reliability can be further improved.

According to the fourth aspect or the first possible implementation of the fourth aspect, in a second possible implementation of the communication device, the communication device further includes a receiving module, and the receiving module is configured to receive the transmission parameter information sent by the network side device, or the determining module is further configured to determine the transmission parameter information.

According to any one of the fourth aspect or the implementations of the fourth aspect, in a third possible implementation of the communication device, the sending module is further configured to send the transmission parameter information to the coordinating device before the initial transmission moment arrives. In this implementation, the coordinating device does not need to continuously listen to the transmission parameter information sent by the network side device on a downlink, thereby reducing listening overheads of the coordinating device.

According to any one of the fourth aspect or the implementations of the fourth aspect, in a fourth possible implementation of the communication device, the sending module is specifically configured to send the to-be-transmitted data to the coordinating device through a D2D link between the communication device and the coordinating device.

According to any one of the fourth aspect or the implementations of the fourth aspect, in a fifth possible implementation of the communication device, before the initial transmission moment arrives, if the communication device receives no first indication information fed back by the coordinating device, the sending module is further configured to retransmit the to-be-transmitted data to the coordinating device, and send the transmission parameter information to the coordinating device, where the first indication information indicates that the coordinating device successfully obtains the transmission parameter information and the to-be-transmitted data. If the target device receives no first indication information fed back by any coordinating device, it indicates that no coordinating device successfully obtains the transmission parameter information and the to-be-transmitted data at present. Therefore, the target device may perform retransmission, to increase a success probability of receiving the to-be-transmitted data and the transmission parameter information by the coordinating device.

According to any one of the fourth aspect or the implementations of the fourth aspect, in a sixth possible implementation of the communication device, the sending module is further configured to send second indication information to the coordinating device, where the second indication information indicates that the communication device requests the coordinating device to send the to-be-transmitted data to the network side device.

According to any one of the first aspect, the third aspect, or the foregoing implementations, in another possible implementation, the transmission parameter information includes at least one of time-frequency resource information, spatial domain resource information, code domain resource information, uplink pilot resource information, uplink power control information, modulation and coding scheme information, and retransmission mechanism information.

In another possible implementation, when the coordinating device has the transmission parameter information and successfully receives the to-be-transmitted data sent by the target device, the coordinating device may further determine whether a transmission condition of the coordinating device is better than that of the target device. When the transmission condition of the coordinating device is better than that of the target device, the coordinating device sends fifth indication information to the target device. The fifth indication information indicates that the transmission condition of sending the to-be-transmitted data by the coordinating device is better than the transmission condition of sending the to-be-transmitted data by the target device. The first possible implementation of the second aspect may alternatively be replaced with the following: Before the initial transmission moment corresponding to the to-be-transmitted data arrives, if the target device receives the fifth indication information fed back by the coordinating device, the target device skips sending the to-be-transmitted data to the network side device. Because the transmission condition of the coordinating device is better than that of the target device, the target device may not send the to-be-transmitted data to the network side device, but only the coordinating device sends the to-be-transmitted data to the network side device. In this way, a success probability of transmitting the to-be-transmitted data can still be increased, so that link reliability can be further improved.

According to another aspect of this application, a data transmission system is provided. The system includes the network side device and the communication device in the foregoing aspects. The communication device includes at least two D2D, M2M, or cooperation communication devices, for example, the coordinating device and the target device in the foregoing aspects.

According to another aspect of this application, a computer-readable storage medium is provided. The computer-readable storage medium stores a computer software instruction used by the coordinating device, and when the instruction runs on a computer, the computer performs the method according to the foregoing aspects.

According to another aspect of this application, a computer-readable storage medium is provided. The computer-readable storage medium stores a computer software instruction used by the target device, and when the instruction runs on a computer, the computer performs the method according to the foregoing aspects.

DESCRIPTION OF EMBODIMENTS

The following describes the technical solutions in the embodiments of the present disclosure with reference to the accompanying drawings in the embodiments of the present disclosure.

Figure 1:
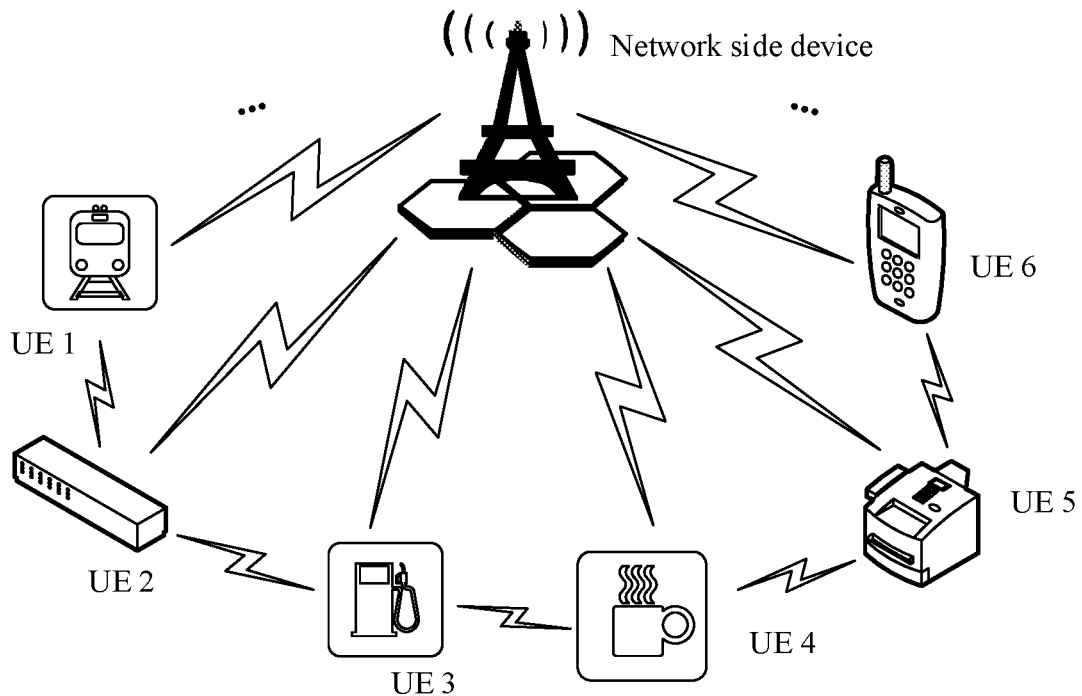
FIG. 1 is an example schematic diagram of a communications system according to an embodiment of the present disclosure.

The technical solutions in the embodiments of the present disclosure described below may be applied to a communications system. The communications system may include a network side device and at least two terminal devices communicating with the network side device. Two or more terminal devices may also communicate with each other. FIG. 1 is an example of the communications system. The communications system shown in FIG. 1 includes one network side device and a plurality of terminal devices (UE 1 to UE 6 shown in FIG. 1) communicating with the network side device.

The network side device may be a device that can communicate with a terminal device. The network side device may be a base station (a macro base station, a small cell/a micro base station, a home eNodeB, or the like), a relay station, or an access point. The base station may be a BTS (Base Transceiver Station) in a GSM (Global System for Mobile Communications) or a CDMA (Code Division Multiple Access) network, or may be an NB (NodeB) in WCDMA (Wideband Code Division Multiple Access), or may be an eNB or eNodeB (Evolutional NodeB) in LTE (Long Term Evolution). Alternatively, the network side device may be a TRPx (Transmission Reception Point, transmission reception point) in a network. Alternatively, the network side device may be a radio controller in a CRAN (Cloud Radio Access Network) scenario. Alternatively, the network side device may be a network side device in a future 5G network or a network device in a future evolved PLMN network. Alternatively, the network side device may be a wearable device or an in-vehicle device.

The terminal device may be UE (User Equipment), an access terminal, a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a SIP (Session Initiation Protocol) phone, a WLL (Wireless Local Loop) station, a PDA (Personal Digital Assistant), a handheld device or a computing device having a wireless communication function, or another processing device connected to a wireless modem, an in-vehicle device, a wearable device, a terminal device in a future 5G network or a terminal device in a future evolved PLMN network, or the like.

In a process in which a terminal device transmits data to the network side device, if initial transmission fails, the terminal device may initiate retransmission to the network side device. Actually, a failure probability of initial transmission is much higher than a failure probability of retransmission for failed initial transmission. Therefore, how to increase a success probability of initial transmission in data transmission becomes an important means of improving link transmission reliability. For this case, the technical solutions provided in the embodiments of the present disclosure are as follows: When a target device needs to transmit data to a network side device, the target device first sends, to a coordinating device before an initial transmission moment arrives, to-be-transmitted data that needs to be sent, where the coordinating device has transmission parameter information, and the transmission parameter information indicates a parameter that needs to be used by the target device to send the to-be-transmitted data to the network side device, so that when the initial transmission moment arrives, the coordinating device may send the to-be-transmitted data to the network side device based on the transmission parameter information. In this way, the coordinating device helps the target device transmit data. The technical solutions provided in the embodiments of the present disclosure can help the terminal device perform initial transmission of data, increase a success probability of initial transmission, and further improve link reliability. It may be understood that the foregoing coordinating device and target device may be the terminal device described above. In the embodiments of the present disclosure, to differentiate between terminal devices, a device that requests another device to help perform initial transmission may be referred to as a target device, and a device that helps another device to perform initial transmission may be referred to as a coordinating device. It may be understood that this is merely an example description.

An embodiment of the present disclosure provides a data transmission method. The following embodiments are described by using an example in which a target device needs to transmit data to a network side device and a coordinating device helps the target device to transmit the data to the network side device.

Figure 2:
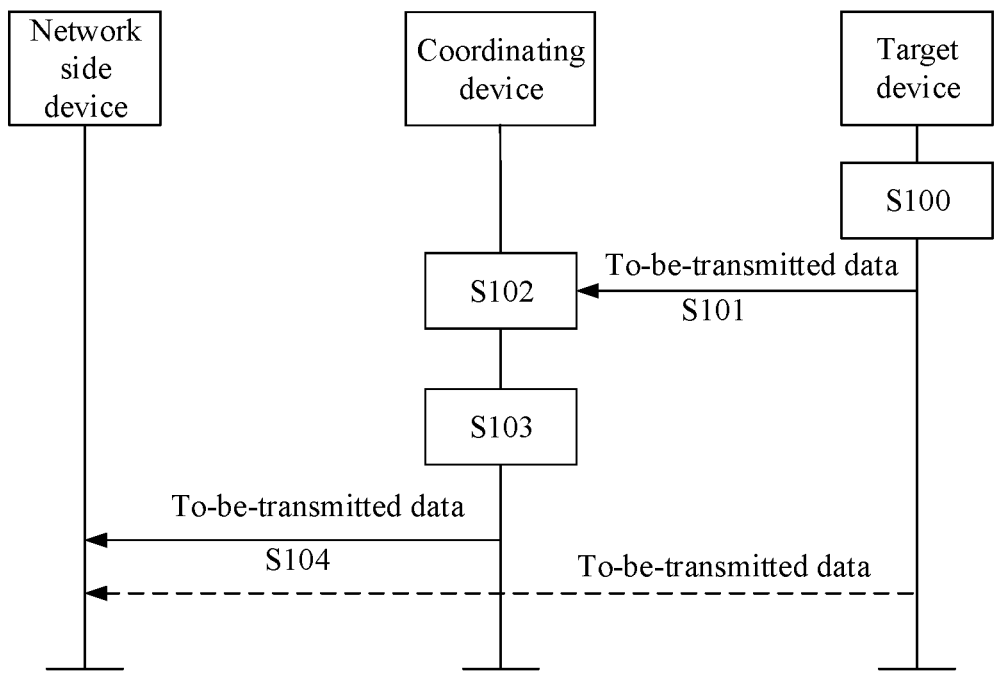
FIG. 2 is an example flowchart of a data transmission method according to an embodiment of the present disclosure.

As shown in FIG. 2, in a first embodiment of the data transmission method, the method includes the following operations.

S100. A target device determines to-be-transmitted data that needs to be transmitted to a network side device.

In this embodiment of the present disclosure, when the target device needs to perform uplink transmission to the network side device, the target device first determines uplink data that needs to be transmitted to the network side device, to be specific, the to-be-transmitted data.

Operation S101. Before an initial transmission moment at which the target device sends the to-be-transmitted data to the network side device arrives, the target device sends the to-be-transmitted data to a coordinating device.

Operation S102. The coordinating device receives the to-be-transmitted data sent by the target device.

In an embodiment, the target device may first receive transmission parameter information sent by the network side device. The transmission parameter information indicates a parameter that needs to be used by the target device to send the to-be-transmitted data to the network side device. The transmission parameter information is one type of uplink grant information, and is sent by the network side device to the target device. The transmission parameter information may include but is not limited to at least one of time-frequency resource information (including a time domain resource (for example, a radio frame, a subframe, or a symbol) and a frequency domain resource (for example, a subcarrier or a resource block)), spatial domain resource information (for example, a transmit antenna and a beam), code domain resource information (for example, a sparse code multiple access (SCMA) codebook, a low density signature (LDS) sequence, and CDMA code), uplink pilot resource information, uplink power control information (for example, upper limit control of uplink transmit power), modulation and coding scheme information (for example, a transport block size, a bit rate, and a modulation order setting), and retransmission mechanism information (for example, a hybrid automatic repeat request "HARQ" mechanism).

In an embodiment, the target device may determine the initial transmission moment of the to-be-transmitted data by adding a time offset value to a moment at which the transmission parameter information is received. The time offset value may be obtained by looking up a table based on a protocol, so that there is no need to indicate the initial transmission moment by using the transmission parameter information, and a size of the transmission parameter information may be reduced, thereby saving transmission resources. Alternatively, the time offset value may also be indicated by using the transmission parameter information.

In an embodiment, the transmission parameter information may further include a parameter used to indicate the initial transmission moment.

In an embodiment, the target device may further send the to-be-transmitted data to the network side device in a grant-free transmission manner.

Grant-free transmission may mean that a terminal device performs uplink data transmission without a grant from a network device. The granting may be as follows: The terminal device sends an uplink scheduling request to the network device, and after receiving the scheduling request, the network device sends an uplink grant to the terminal device, where the uplink grant indicates an uplink transmission resource allocated to the terminal device.

Grant-free transmission may be a method for implementing uplink data transmission of a terminal device without dynamic scheduling performed by a network device. The dynamic scheduling may be a scheduling manner in which the network device indicates, by using signaling, a transmission resource for each uplink data transmission of the terminal device.

Grant-free transmission may be as follows: A network device pre-allocates a plurality of transmission resources to a terminal device and notifies the terminal device of the transmission resources. When the terminal device has an uplink data transmission requirement, the terminal device selects at least one transmission resource from the plurality of transmission resources that are pre-allocated by the network device, and sends uplink data by using the selected transmission resource. The network device detects, on one or more of the plurality of pre-allocated transmission resources, the uplink data sent by the terminal device.

In an embodiment, when the target device uses the grant-free transmission manner, the target device may determine transmission parameter information and the initial transmission moment by itself. For example, the target device may select one piece of transmission parameter information from a preset transmission parameter information base for grant-free transmission, and further determine the initial transmission moment based on the selected transmission parameter information.

In an embodiment, operation S101 includes: The target device sends the to-be-transmitted data to the coordinating device through a D2D (Device to Device) link between the target device and the coordinating device. Operation S102 includes: The coordinating device receives, through the D2D link between the coordinating device and the target device, the to-be-transmitted data sent by the target device. The D2D link may also be referred to as a sidelink. D2D link communication is not limited by network coverage, and may be performed in a plurality of scenarios such as a scenario with network coverage, a scenario without network coverage, and a scenario with partial network coverage, and has a positive effect on reducing base station load, reducing a communication delay, reducing UE power consumption, and the like.

In an embodiment, a base station may instruct the target device and the coordinating device to establish the D2D link. If the base station authorizes the target device and the coordinating device to perform D2D communication, it may be considered that the D2D link is established between the target device and the coordinating device. Alternatively, the D2D link may be established between the target device and the coordinating device through negotiation (for example, D2D discovery or D2D synchronization). If the coordinating device receives a synchronization signal from the target device, and synchronizes with the target device to receive information sent by the target device, it may be considered that the D2D link is established between the target device and the coordinating device. Alternatively, if the target device discovers the coordinating device through D2D discovery, and the coordinating device agrees to be discovered, it may be considered that the D2D link is established between the target device and the coordinating device. The base station may indicate a control channel corresponding to the D2D link to the target device and the coordinating device. The target device and the coordinating device may obtain, through the control channel corresponding to the D2D link, control information corresponding to D2D link communication, and obtain data information of the D2D link communication based on the control information.

In this embodiment of the present disclosure, the target device may send the to-be-transmitted data to the coordinating device in broadcast, multicast, or unicast mode.

In broadcast mode, the target device may send the to-be-transmitted data to all coordinating devices within a coverage area of the target device. Sending the to-be-transmitted data in broadcast mode may enable as many coordinating devices as possible to receive the to-be-transmitted data, so that as many coordinating devices as possible can help the target device send the to-be-transmitted data.

In multicast mode, the target device may send the to-be-transmitted data to a group of coordinating devices within a coverage area of the target device. In this case, there are at least two coordinating devices. When the to-be-transmitted data is multicast, a group identifier may be multicast, so that a coordinating device identifies, based on the group identifier, whether the received to-be-transmitted data is data sent to the coordinating device. When the D2D link is established, the base station may notify the target device of the group identifier.

In unicast mode, the target device may send the to-be-transmitted data to a specific coordinating device within a coverage area of the target device. When the to-be-transmitted data is unicast, an identifier of the coordinating device may be unicast, so that the coordinating device identifies that the received to-be-transmitted data is data sent to the coordinating device. When the D2D link is established, the base station or the coordinating device may notify the target device of the identifier corresponding to the coordinating device.

In an embodiment, the target device may repeatedly send the to-be-transmitted data to the coordinating device, to increase a success probability of receiving the to-be-transmitted data by the coordinating device. A quantity of repetition times may be set depending on an actual need. This is not limited herein.

In an embodiment, the coordinating device may feed back, to the target device, whether the to-be-transmitted data is successfully received, so that the target device can adjust sending of the to-be-transmitted data based on a feedback of the coordinating device in time, to use transmission resources in a more proper manner. For example, after successfully receiving the to-be-transmitted data, the coordinating device may feed back ACK (Acknowledgement) information to the target device, to notify the target device that the to-be-transmitted data is successfully received. Therefore, the target device does not need to retransmit the to-be-transmitted data to the coordinating device. If the coordinating device fails to receive the to-be-transmitted data (for example, the coordinating device fails to decode and verify the to-be-transmitted data), the coordinating device may feed back NACK (negative-acknowledgement) information to the target device, to notify the target device that the to-be-transmitted data fails to be received. In this case, the target device may retransmit the to-be-transmitted data to the coordinating device; or the target device may not retransmit the to-be-transmitted data to the coordinating device, but send the to-be-transmitted data to the network side device by itself when the initial transmission moment arrives.

In an embodiment, when the target device sends the to-be-transmitted data to coordinating devices in broadcast or multicast mode, the coordinating devices may feed back only ACKs to the target device, but does not need to feed back NACKs to the target device. For the target device, there is no need to clearly learn of a specific coordinating device that feeds back an ACK, and the target device may determine that there is a coordinating device that successfully receives the to-be-transmitted data, provided that at least one ACK is received. Therefore, the target device does not need to retransmit the to-be-transmitted data to the coordinating devices. If the target device receives no ACK, the target device may determine that no coordinating device successfully receives the to-be-transmitted data. Therefore, the target device may retransmit the to-be-transmitted data to the coordinating devices; or the target device may not retransmit the to-be-transmitted data to the coordinating devices, but send the to-be-transmitted data to the network side device by itself when the initial transmission moment arrives. In one embodiment, the coordinating devices may feed back ACKs by using a same transmission configuration parameter (for example, a time-frequency resource, a modulation and coding scheme, or a sequence that carries ACK ratio information), so that the target device can parse, by using a same rule, the ACKs received from the different coordinating devices. Otherwise, if the coordinating devices feed back ACKs by using different transmission configuration parameters, the target device needs to clearly learn of coordinating devices around the target device, and a transmission configuration parameter of an ACK corresponding to each coordinating device needs to be agreed on in advance.

In an embodiment, when the target device sends the to-be-transmitted data in unicast mode, a coordinating device may feed back an ACK and/or a NACK to the target device. When receiving the ACK, the target device may determine that the coordinating device successfully receives the to-be-transmitted data. Therefore, the target device does not need to retransmit the to-be-transmitted data to the coordinating device. When receiving the NACK, the target device may determine that the coordinating device fails to receive the to-be-transmitted data. Therefore, the target device may retransmit the to-be-transmitted data to the coordinating device; or the target device may not retransmit the to-be-transmitted data to the coordinating device, but send the to-be-transmitted data to the network side device by itself when the initial transmission moment arrives; or the target device may send the to-be-transmitted data to another device, to request the another device to help the target device send the to-be-transmitted data. In one embodiment, the another device may be the terminal device described above.

In an embodiment, the coordinating device may not feed back, to the target device, whether the coordinating device successfully receives the to-be-transmitted data.

It may be understood that, in the prior art described in the background, because the RN may not know a TA (Timing Advance) value for sending the uplink data by the UE, when listening to the uplink data, the RN cannot learn of an accurate moment at which the uplink data arrives at the RN, and demodulation may fail due to a TA deviation. However, in this embodiment of the present disclosure, because the to-be-transmitted data is directly sent by the target device to the coordinating device, a demodulation failure caused by a TA deviation does not occur. This embodiment of the present disclosure further improves data transmission reliability.

Operation S103. The coordinating device obtains the transmission parameter information.

Figure 3:
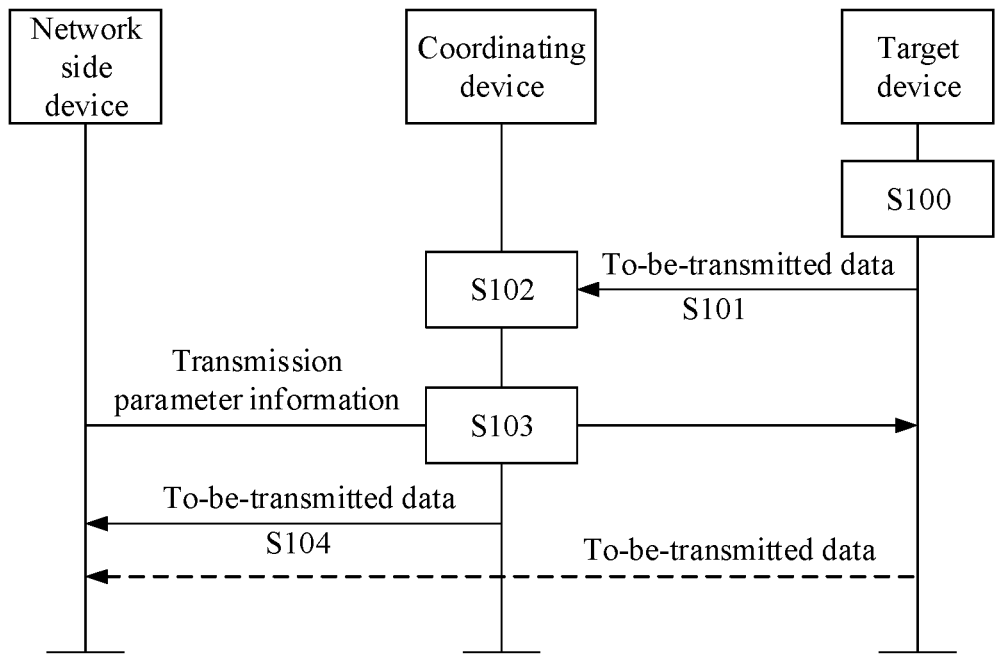
FIG. 3 is another example flowchart of a data transmission method according to an embodiment of the present disclosure.

In this embodiment of the present disclosure, the coordinating device may obtain the transmission parameter information in the following manners:

Obtaining manner 1: As shown in FIG. 3, the method further includes: The network side device sends the transmission parameter information to the target device. Operation S103 includes: The coordinating device listens to information sent by the network side device to the target device, to obtain the transmission parameter information. In an embodiment, the coordinating device may listen to, based on an identifier of the target device, the information sent by the network side device to the target device. For example, the coordinating device may listen to control information sent by the network side device, and parse the control information by using the identifier of the target device. If the control information can be correctly parsed, the coordinating device determines whether the received information meets a format of the transmission parameter information. When the received information meets the format of the transmission parameter information, the coordinating device may determine that the information is the transmission parameter information.

Figure 4:
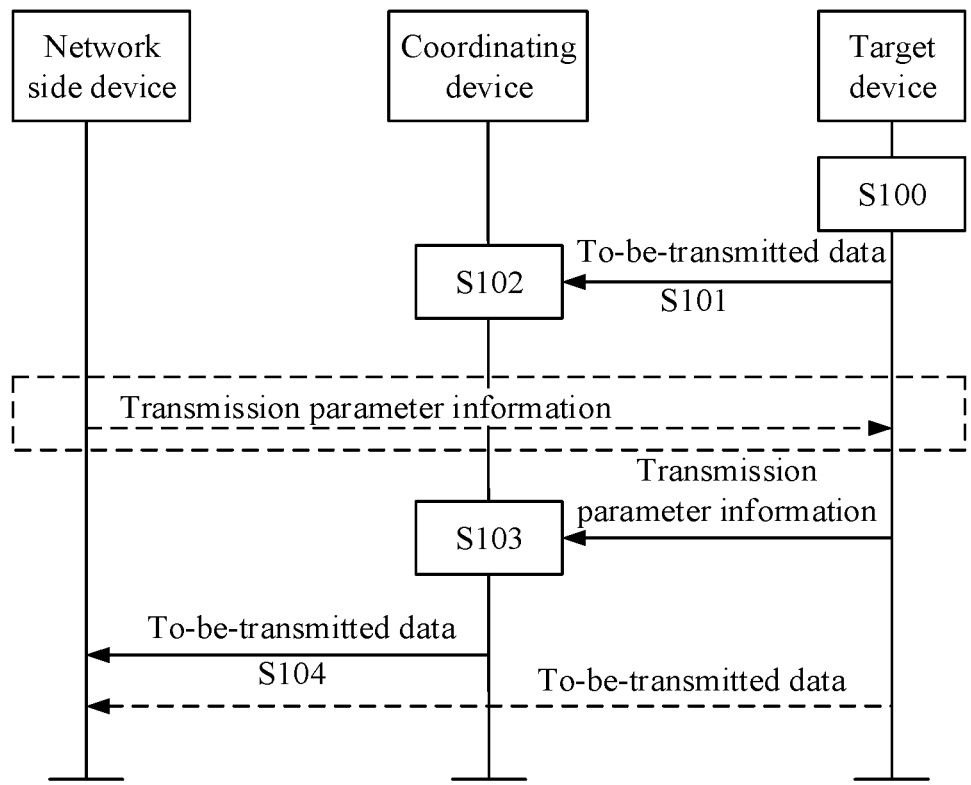
FIG. 4 is still another example flowchart of a data transmission method according to an embodiment of the present disclosure.

Obtaining manner 2: As shown in FIG. 4, the target device sends the transmission parameter information to the coordinating device. Operation S103 includes: The coordinating device receives the transmission parameter information sent by the target device. The coordinating device does not need to continuously listen to the transmission parameter information sent by the network side device on a downlink, but only needs to receive the transmission parameter information sent by the target device on the D2D link, and frequency of delivering control information by the network side device is much higher than frequency of sending the transmission parameter information by the target device on the D2D link. However, the control information delivered by the network side device further includes control information sent to another device, and the control information delivered each time is not always the transmission parameter information sent to the target device. Therefore, receiving the transmission parameter information sent by the target device on the D2D link reduces listening overheads of the coordinating device, and particularly, when the network side device frequently sends the control information, an effect of reducing the listening overheads of the coordinating device is more obvious.

In an embodiment, the target device may send the transmission parameter information to the coordinating device in broadcast, multicast, or unicast mode. The target device may send the transmission parameter information and the to-be-transmitted data in a same manner. Details are not described herein again.

In an embodiment, the coordinating device may feed back, to the target device, whether the transmission parameter information is successfully obtained, so that the target device can adjust sending of the transmission parameter information based on a feedback of the coordinating device in time, to use transmission resources in a more proper manner. The target device may feedback, in a same manner, whether the transmission parameter information is successfully obtained and whether the to-be-transmitted data is successfully received. Details are not described herein again.

In an embodiment, the coordinating device feeds back first indication information to the target device. The first indication information indicates that the coordinating device successfully obtains the transmission parameter information and the to-be-transmitted data. Before the initial transmission moment arrives, if the target device receives no first indication information fed back by the coordinating device, the target device retransmits the to-be-transmitted data to the coordinating device, and sends the transmission parameter information to the coordinating device. If the target device receives no first indication information fed back by any coordinating device after sending the to-be-transmitted data to coordinating devices or after sending the to-be-transmitted data and the transmission parameter information to coordinating devices, it indicates that no coordinating device successfully obtains the transmission parameter information and the to-be-transmitted data at present. Therefore, the target device may perform retransmission, to increase a success probability of receiving the to-be-transmitted data and the transmission parameter information by the coordinating device.

Figure 5:
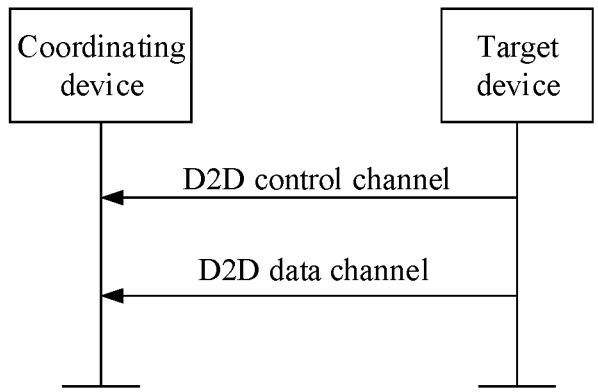
FIG. 5 is an example schematic diagram of a D2D link from a target device to a coordinating device according to an embodiment of the present disclosure.

In this embodiment of the present disclosure, the target device sends the to-be-transmitted data and the transmission parameter information to the coordinating device based on the foregoing description. For ease of description, the to-be-transmitted data and the transmission parameter information that are sent by the target device to the coordinating device may be collectively referred to as information. As shown in FIG. 5, the D2D link from the target device to the coordinating device includes a control channel and a data channel. The control channel may be, for example, a PSCCH (Physical Sidelink Control Channel) defined in LTE-A (LTE-Advanced). The data channel may be, for example, a PSSCH (Physical Sidelink Shared Channel) defined in LTE-A. In an implementation, the target device may send control information to the coordinating device through the control channel, where the control information may include the transmission parameter information and control information corresponding to D2D communication, and the target device sends the to-be-transmitted data to the coordinating device through the data channel. The coordinating device parses, based on the control information corresponding to the D2D communication, data received through the data channel (that is, parses out the to-be-transmitted data), and parses out the transmission parameter information based on an instruction of the control information. In another implementation, the target device may send the transmission parameter information and the to-be-transmitted data to the coordinating device through the data channel. The control channel is further used to transmit control information corresponding to D2D communication. The coordinating device parses, based on the control information corresponding to the D2D communication, data received through the data channel (that is, parses out the to-be-transmitted data and the transmission parameter information).

In one embodiment, an execution sequence of operations S100 and S101 performed by the target device and operation S103 performed by the coordinating device may not be limited. An execution sequence of operations S102 and S103 performed by the coordinating device may not be limited.

Operation S104: When the initial transmission moment corresponding to the to-be-transmitted data arrives, the coordinating device sends the received to-be-transmitted data to the network side device based on the transmission parameter information.

In an embodiment, the coordinating device may determine the initial transmission moment in a same manner as the target device. Details are not described herein again.

In an embodiment, the coordinating device may learn of, based on the transmission parameter information, parameters such as an occupied time-frequency resource and a used modulation and coding scheme for sending the to-be-transmitted data to the network side device, and when sending the to-be-transmitted data to the network side device, the coordinating device sends the to-be-transmitted data to the network side device based on the parameters such as the time-frequency resource and the modulation and coding scheme.

In this embodiment of the present disclosure, when the target device needs to transmit data to the network side device, the target device first sends, to the coordinating device before the initial transmission moment arrives, the to-be-transmitted data that needs to be transmitted, and the coordinating device may obtain the transmission parameter information, where the transmission parameter information indicates a parameter that needs to be used by the target device to send the to-be-transmitted data to the network side device, so that when the initial transmission moment arrives, the coordinating device may send the to-be-transmitted data to the network side device based on the transmission parameter information. In this way, the coordinating device helps the target device transmit data. In other words, the coordinating device helps the target device perform initial transmission of the to-be-transmitted data, thereby increasing a success probability of initial transmission, and further improving link reliability.

After receiving the to-be-transmitted data, the network side device performs decoding and verification on the received to-be-transmitted data, to determine whether the to-be-transmitted data is successfully received, and feeds back, to the target device, whether the to-be-transmitted data is successfully received. For example, the network side device may feed back NACK information (to be specific, the following third indication information) or an ACK (to be specific, the following fourth indication information). The ACK indicates that the to-be-transmitted data is successfully received, and the NACK indicates that the to-be-transmitted data fails to be received. The coordinating device may learn of a sending moment of the ACK or NACK information based on a time sequence between an uplink grant, uplink transmission, and a downlink feedback, and may further listen to the ACK or NACK information.

Figure 6:
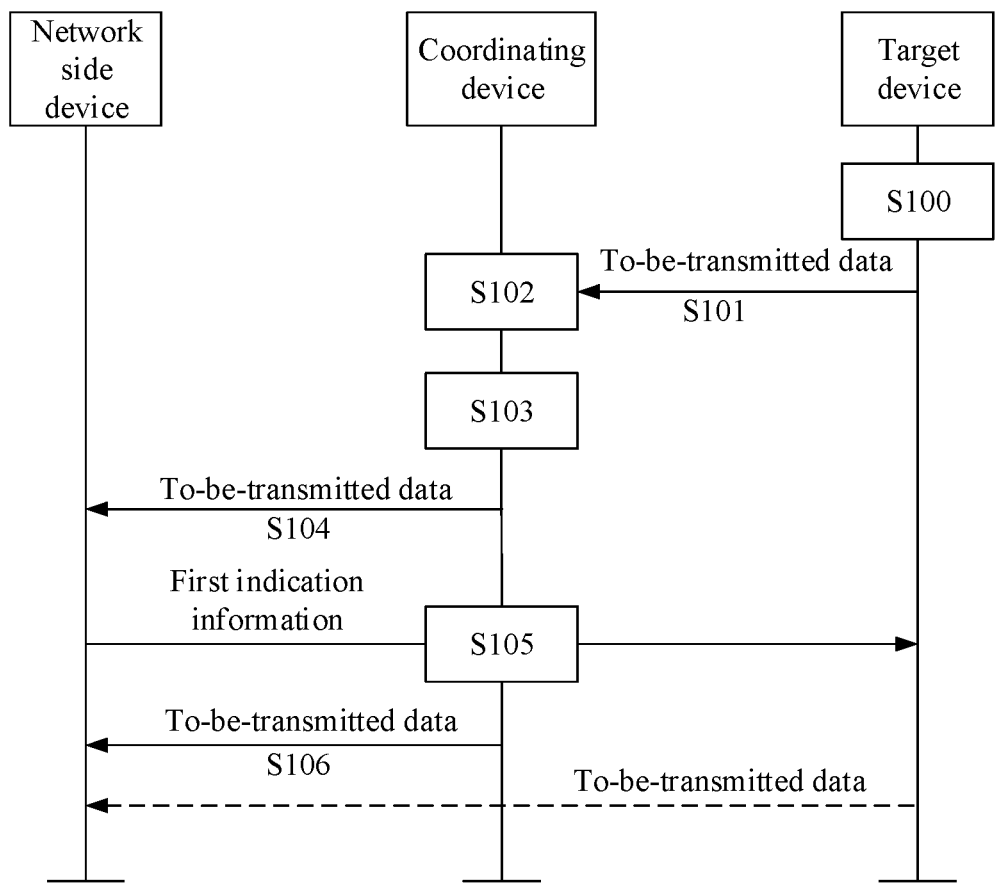
FIG. 6 is an example flowchart of a data transmission method according to another embodiment of the present disclosure.

Further, to further increase a success probability of transmitting the to-be-transmitted data to the network side device by the target device, so as to further improve link reliability, as shown in FIG. 6, the present disclosure further provides a second embodiment of the data transmission method based on the first embodiment of the data transmission method. In the second embodiment, the method further includes the following operations.

Operation S105. The coordinating device obtains the third indication information fed back by the network side device for the to-be-transmitted data, where the third indication information indicates that the network side device fails to receive the to-be-transmitted data.

In this embodiment of the present disclosure, the network side device sends the third indication information on a dedicated downlink control channel. The coordinating device may determine, based on a related configuration and parameter used for uplink transmission of the coordinating device, information such as a sending moment and a frequency resource that are corresponding to the third indication information, and obtain the third indication information on the frequency resource at the sending moment corresponding to the third indication information.

It may be understood that, because the target device has the transmission parameter information, the target device may determine, based on the transmission parameter information, information such as a sending moment and a frequency resource for feeding back the ACK/NACK information by the network side device, to obtain the ACK/NACK information.

Operation S106: When a retransmission moment corresponding to the to-be-transmitted data arrives, the coordinating device retransmits the received to-be-transmitted data to the network side device.

In an embodiment, for details about a specific manner in which the coordinating device obtains a parameter used for retransmitting the to-be-transmitted data, refer to a manner in which the coordinating device obtains the transmission parameter information. Details are not described herein again.

In this embodiment of the present disclosure, the coordinating device may determine the retransmission moment based on the initial transmission moment and a preset time sequence between the initial transmission moment and the retransmission moment.

In this embodiment, in addition to helping the target device complete initial transmission, the coordinating device may further help the target device perform retransmission, thereby further increasing the success probability of transmitting the to-be-transmitted data to the network side device by the target device, and further improving link reliability.

Further, when successfully receiving the to-be-transmitted data, the network side device feeds back the fourth indication information to the target device. The coordinating device may also listen to the fourth indication information. After detecting the fourth indication information through listening, the coordinating device stops retransmitting the to-be-transmitted data to the network side device. Alternatively, the coordinating device may stop retransmitting the to-be-transmitted data to the network side device when a quantity of retransmission times reaches a preset maximum quantity of retransmission times.

Further, to further improve timeliness of transmitting the to-be-transmitted data to the network side device by the target device, based on the first or second embodiment of the data transmission method, the present disclosure further provides a third embodiment of the data transmission method. In the third embodiment, the transmission parameter information further indicates a parameter that needs to be used by the target device to send the to-be-transmitted data to the network side device again, and operation S104 is replaced with the following operation: The coordinating device sends the to-be-transmitted data to the network side device again based on the transmission parameter information.

In an embodiment, meaning of the "again" described above may be understood as retransmission, and retransmission may be performed based on a feedback from a base station. Alternatively, the "again" described above may be understood as repeated transmission. To be specific, a base station may not feed back whether the to-be-transmitted data is successfully received, and the coordinating device automatically and repeatedly sends the to-be-transmitted data to the base station. During repeated transmission, the coordinating device may transmit different to-be-transmitted data each time.

In an embodiment, the target device may first send transmission parameter information and to-be-transmitted data that are corresponding to a plurality of uplink transmission tasks to the coordinating device. The coordinating device may first cache the transmission parameter information and the to-be-transmitted data that are in a one-to-one correspondence. Information such as a transmission moment and a time-frequency resource of each piece of the to-be-transmitted data may be determined based on each piece of the transmission parameter information. When the transmission moment arrives, the corresponding to-be-transmitted data is sent based on the information such as the time-frequency resource.

In an embodiment, when the target device performs uplink transmission in a grant-free manner, the target device may select transmission parameter information from a preset transmission parameter information base. If there are a plurality of pieces of transmission parameter information that can be selected by the target device at present, the target device may select a plurality of pieces of transmission parameter information. The target device may send all the plurality of pieces of selected transmission parameter information to the coordinating device, and send to-be-transmitted data to the coordinating device. The coordinating device may separately determine information such as a transmission moment and a time-frequency resource of each piece of to-be-transmitted data based on each piece of transmission parameter information. When the transmission moment arrives, the to-be-transmitted data is sent based on the information such as the time-frequency resource.

In one embodiment, the target device may send a plurality of pieces of transmission parameter information and corresponding to-be-transmitted data to the coordinating device when uplink transmission frequency is not high, so that the target device does not need to occupy resources to send the transmission parameter information and the to-be-transmitted data to the coordinating device when subsequent uplink transmission frequency is relatively high. In this way, the target device can use resources in a more proper manner, and timeliness of data transmission is improved.

Figure 7:
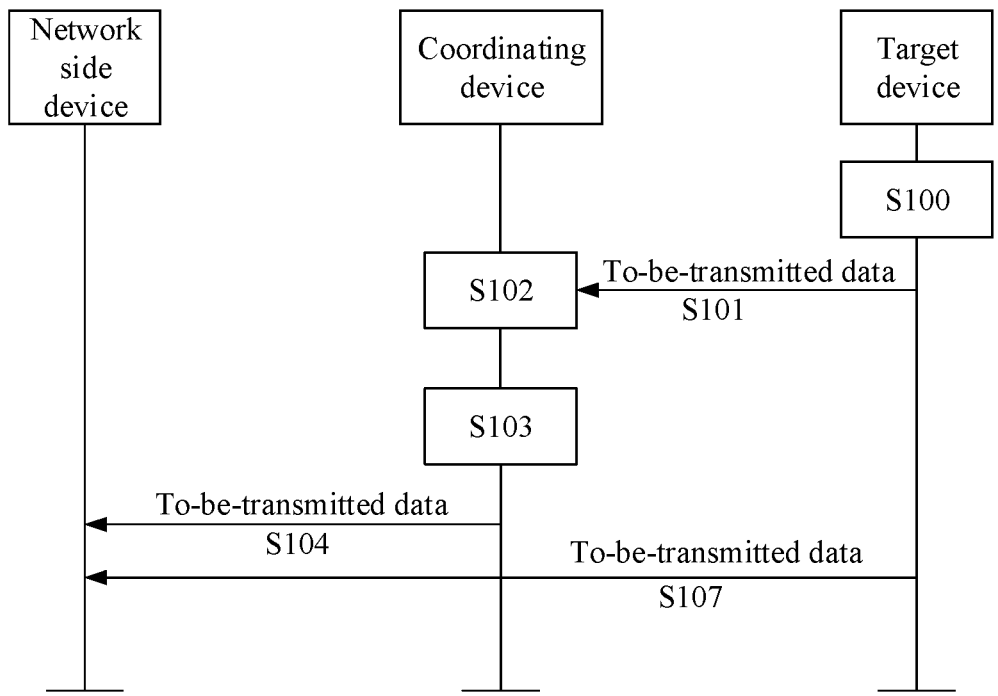
FIG. 7 is an example flowchart of a data transmission method according to still another embodiment of the present disclosure.

The foregoing embodiments describe a case in which the coordinating device sends the to-be-transmitted data to the network side device when the initial transmission moment arrives. Based on any one of the first to third embodiments of the data transmission method, when the initial transmission moment arrives, whether the target device sends the to-be-transmitted data to the network side device may be determined in the following several manners:

Implementation 1: As shown in FIG. 7, the method further includes the following operation:

Operation S107: When the initial transmission moment corresponding to the to-be-transmitted data arrives, the target device sends the to-be-transmitted data to the network side device based on the transmission parameter information.

In Implementation 1, both the target device and the coordinating device upload the to-be-transmitted data at the initial transmission moment, and the network side device actually receives both the to-be-transmitted data sent by the target device and the to-be-transmitted data sent by the coordinating device, thereby enhancing strength of the to-be-transmitted data received by the network side device. In this way, a success probability of receiving the to-be-transmitted data by the network side device can be further increased, so that link reliability can be further improved.

In one embodiment, if the target device receives indication information that is fed back by the network side device and that indicates that the to-be-transmitted data fails to be received, when the retransmission moment corresponding to the to-be-transmitted data arrives, the target device retransmits the to-be-transmitted data to the network side device. Therefore, when receiving the retransmitted data, the network side device actually receives both the to-be-transmitted data retransmitted by the target device and the to-be-transmitted data retransmitted by the coordinating device. In this way, a success probability of receiving the to-be-transmitted data by the network side device can be further increased, so that link reliability can be further improved.

Implementation 2: The target device may further determine, based on a feedback of the coordinating device, whether to send the to-be-transmitted data to the network side device. For example, the target device does not send the to-be-transmitted data to the network side device when the coordinating device has the transmission parameter information and successfully receives the to-be-transmitted data sent by the target device.

In an embodiment, when the coordinating device has the transmission parameter information and successfully receives the to-be-transmitted data sent by the target device, the coordinating device may further determine whether a transmission condition of the coordinating device is better than that of the target device. The transmission condition may be determined based on at least one indicator such as a distance between terminal device and the network side device, and uplink quality of the terminal devices. For example, when a distance between the coordinating device and the network side device is less than a distance between the target device and the network side device, it may be determined that the transmission condition of the coordinating device is better than the transmission condition of the target device. Alternatively, when uplink quality of the coordinating device is better than uplink quality of the target device, it may be determined that the transmission condition of the coordinating device is better than the transmission condition of the target device.

When the transmission condition of the coordinating device is better than that of the target device, fifth indication information is sent to the target device. The fifth indication information indicates that the transmission condition of sending the to-be-transmitted data by the coordinating device is better than the transmission condition of sending the to-be-transmitted data by the target device. The method further includes: Before the initial transmission moment corresponding to the to-be-transmitted data arrives, if the target device receives the fifth indication information fed back by the coordinating device, the target device skips sending the to-be-transmitted data to the network side device. Because the transmission condition of the coordinating device is better than that of the target device, the target device may not send the to-be-transmitted data to the network side device, but only the coordinating device sends the to-be-transmitted data to the network side device. In this way, the success probability of transmitting the to-be-transmitted data can still be increased, so that link reliability can be further improved.

In an embodiment, the coordinating device may broadcast location information of the coordinating device, so that the target device obtains the location information of the coordinating device. The target device may also broadcast location information of the target device, so that the coordinating device obtains the location information of the target device. In one embodiment, the coordinating device may further determine a location of the target device by using information that is sent by the network side device to the target device and that is detected through listening. For example, the coordinating device may determine the distance between the target device and the network side device based on power of the information.

In an embodiment, received signal strength (power) of a signal received from the network side device by the coordinating device may be compared with received signal strength (power) of a signal received from the network side device by the target device, and a device with higher received signal strength is considered as a device with a better transmission condition.

According to Implementation 2, load of the target device is reduced, and the success probability of transmitting the to-be-transmitted data can be increased, thereby improving link reliability.

In an embodiment, when the target device sends the to-be-transmitted data and/or the transmission parameter information to coordinating devices in broadcast or multicast mode, the target device does not need to clearly learn of a specific coordinating device that feeds back the first indication information, and the target device may determine that there is a coordinating device that can help the target device transmit the to-be-transmitted data, provided that the target device receives at least one piece of first indication information. Therefore, the target device may not transmit the to-be-transmitted data to the network side device. In one embodiment, the coordinating devices may feed back first indication information by using a same transmission configuration parameter (for example, a time-frequency resource, a modulation and coding scheme, or a sequence that carries ACK ratio information), so that the target device can parse, by using a same rule, first indication information received from the different coordinating devices. Otherwise, if the coordinating devices feed back first indication information by using different transmission configuration parameters, the target device needs to clearly learn of coordinating devices around the target device, and a transmission configuration parameter of fourth indication information corresponding to each coordinating device needs to be agreed on in advance.

Further, based on the foregoing embodiments of the data transmission method, the method further includes: The target device may further send second indication information to the coordinating device, where the second indication information indicates that the target device requests the coordinating device to transmit the to-be-transmitted data to the network side device. The coordinating device receives the second indication information sent by the target device.

Alternatively, the network side device may send the second indication information to the coordinating device, and the coordinating device receives the second indication information sent by the network side device.

In an embodiment, when the target device sends the to-be-transmitted data to the coordinating device, the second indication information may be carried in control information corresponding to the to-be-transmitted data, to notify the coordinating device that the coordinating device needs to help the target device forward the to-be-transmitted data to the network side device. Alternatively, when the target device sends the transmission parameter information to the coordinating device, the second indication information may be carried in control information corresponding to the transmission parameter information, to notify the coordinating device that the coordinating device may use the transmission parameter information to help the target device send the to-be-transmitted data to the network side device.

In an embodiment, the second indication information may further be information separately sent by the target device. In other words, the second indication information may be information that is separately sent and that is independent of the to-be-transmitted data and the transmission parameter information. In one embodiment, before operation S101, the target device may further send the second indication information to the coordinating device. In one embodiment, after receiving the second indication information, the coordinating device may determine, by default, that the coordinating device can help the target device send the to-be-transmitted data. In one embodiment, after receiving the second indication information, the coordinating device may further determine whether the coordinating device can help the target device send the to-be-transmitted data.

In an embodiment, the coordinating device may determine the initial transmission moment of the to-be-transmitted data based on the second indication information, and determine, based on a working status of the coordinating device at the initial transmission moment, whether the coordinating device can help the target device send the to-be-transmitted data. For example, when determining that the coordinating device is in an idle state at the initial transmission moment, the coordinating device determines that the coordinating device can help the target device send the to-be-transmitted data. When determining that the coordinating device is in an occupied state at the initial transmission moment, the coordinating device determines that the coordinating device cannot help the target device send the to-be-transmitted data.

In an embodiment, the coordinating device may further determine a distance between the coordinating device and the network side device, determine a distance between the target device and the network side device based on the second indication information, and determine, based on a relationship between the two determined distances, whether to help the target device send the to-be-transmitted data. For example, when the distance between the coordinating device and the network side device is less than the distance between the target device and the network side device, the coordinating device determines that the coordinating device can help the target device send the to-be-transmitted data. When the distance between the coordinating device and the network side device is greater than the distance between the target device and the network side device, the coordinating device determines that the coordinating device cannot help the target device send the to-be-transmitted data.

In an embodiment, the method further includes: After receiving the second indication information, the coordinating device feeds back, to the target device, whether to help the target device send the to-be-transmitted data to the network side device.

In an embodiment, when determining that the coordinating device can help the target device send the to-be-transmitted data, the coordinating device may feed back, to the target device, indication information indicating that the coordinating device can help send the to-be-transmitted data. If the target device receives the indication information indicating that the coordinating device can help send the to-be-transmitted data, operation S101 may be performed. If the target device receives no indication information indicating that the coordinating device can help send the to-be-transmitted data, operation S101 is not performed, and when the initial transmission moment arrives, the target device sends the to-be-transmitted data to the network side device. If the coordinating device determines not to help the target device send the to-be-transmitted data, the coordinating device does not need to perform operation S102, S103, and S104. Before sending the to-be-transmitted data to the coordinating device, the target device first queries whether the coordinating device can help transmit the to-be-transmitted data. After determining that the coordinating device can help transmit the to-be-transmitted data, the target device sends the to-be-transmitted data to the coordinating device. In this way, resource waste is avoided, where the resource waste is caused when the target device still sends the to-be-transmitted data to the coordinating device even though the coordinating device cannot help with transmission.

In one embodiment, when the coordinating device determines that the coordinating device cannot help the target device send the to-be-transmitted data, and the target device sends the second indication information in unicast mode, the coordinating device may feed back, to the target device, indication information indicating that the coordinating device cannot help send the to-be-transmitted data. If the target device receives the indication information indicating that the coordinating device cannot help send the to-be-transmitted data, the target device may send the second indication information to another device, or the target device sends the to-be-transmitted data to the network side device when the initial transmission moment arrives.

Figure 8:
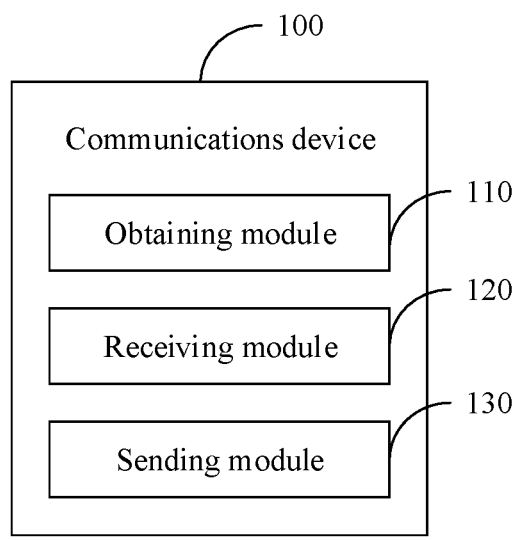
FIG. 8 is an example schematic structural diagram of hardware of a communication device according to an embodiment of the present disclosure.

The present disclosure further provides a communication device 100. The communication device 100 may be the coordinating device described in the foregoing embodiments. As shown in FIG. 8, the communication device 100 includes an obtaining module 110, a receiving module 120, and a sending module 130.

The obtaining module 110 is configured to obtain transmission parameter information. The transmission parameter information indicates a parameter that needs to be used by a target device to send to-be-transmitted data to a network side device.

The receiving module 120 is configured to receive the to-be-transmitted data sent by the target device.

The sending module 130 is configured to send the received to-be-transmitted data to the network side device based on the transmission parameter information when an initial transmission moment corresponding to the to-be-transmitted data arrives.

It can be learned from the foregoing embodiments that the communication device 100 shown in FIG. 8 performs operation S102, operation S103, operation S104, operation S105, and operation S106 in the foregoing embodiments. Specifically, the obtaining module 110 performs operation S103 and operation S105 in the foregoing embodiments. The receiving module 120 performs operation S102 in the foregoing embodiments. The sending module 130 performs operation S104 and operation S106 in the foregoing embodiments. For more details about performing the foregoing operations by the obtaining module 110, the receiving module 120, and the sending module 130, refer to the related descriptions in the foregoing embodiments. Details are not described herein again.

In this embodiment of the present disclosure, when the target device needs to transmit data to the network side device, the target device first sends, to the communication device 100 before the initial transmission moment arrives, the to-be-transmitted data that needs to be transmitted, and the communication device 100 may obtain the transmission parameter information, where the transmission parameter information indicates a parameter that needs to be used by the target device to send the to-be-transmitted data to the network side device, so that when the initial transmission moment arrives, the communication device 100 may send the to-be-transmitted data to the network side device based on the transmission parameter information. Therefore, when the target device needs to send the to-be-transmitted data to the network side device, the communication device 100 may help the target device perform initial transmission of the to-be-transmitted data, thereby increasing a success probability of initial transmission, and further improving link reliability.

Figure 9:
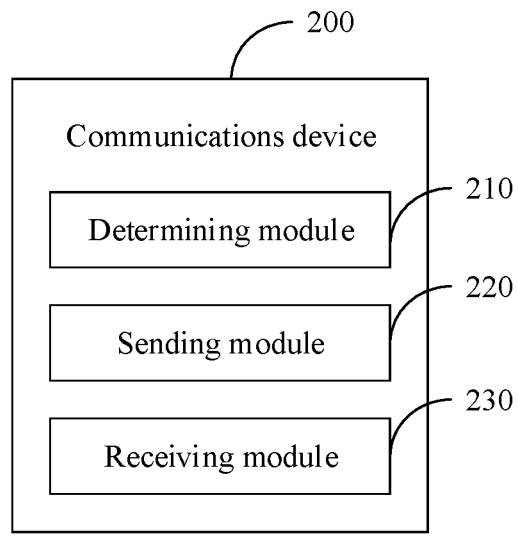
FIG. 9 is an example schematic structural diagram of hardware of a communication device according to another embodiment of the present disclosure.

The present disclosure further provides a communication device 200. The communication device 200 may be the target device described in the foregoing embodiments. As shown in FIG. 9, the communication device 200 includes a determining module 210, a sending module 220, and a receiving module 230.

The determining module 210 is configured to determine to-be-transmitted data that needs to be sent to a network side device.

The sending module 220 is configured to send the to-be-transmitted data to a coordinating device before an initial transmission moment of sending the to-be-transmitted data to the network side device arrives.

The receiving module 230 is configured to receive transmission parameter information sent by the network side device.

It can be learned from the foregoing embodiments that the communication device 200 shown in FIG. 9 performs operation S100, operation S101, and operation S107 in the foregoing embodiments. Specifically, the determining module 210 performs operation S100 in the foregoing embodiments. The sending module 220 performs operation S101 and operation S107 in the foregoing embodiments. For more details about performing the foregoing operations by the determining module 210, the sending module 220, and the receiving module 230, refer to the related descriptions in the foregoing embodiments. Details are not described herein again.

In this embodiment of the present disclosure, when the communication device 200 needs to transmit data to the network side device, the communication device 200 first sends, to the coordinating device before the initial transmission moment arrives, the to-be-transmitted data that needs to be transmitted, and the coordinating device may obtain the transmission parameter information, where the transmission parameter information indicates a parameter that needs to be used by the communication device 200 to send the to-be-transmitted data to the network side device, so that when the initial transmission moment arrives, the coordinating device may send the to-be-transmitted data to the network side device based on the transmission parameter information. Therefore, when the communication device 200 needs to send the to-be-transmitted data to the network side device, the coordinating device may help the communication device 200 perform initial transmission of the to-be-transmitted data, thereby increasing a success probability of initial transmission, and further improving link reliability.

Figure 10:
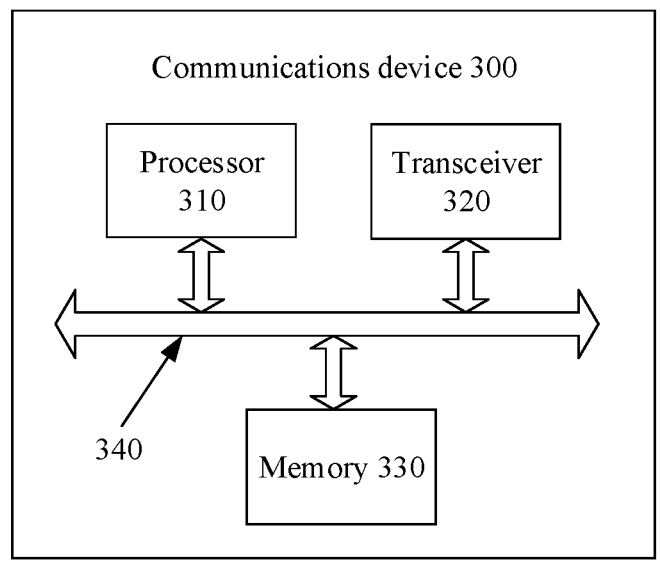
FIG. 10 is an example schematic structural diagram of hardware of a communication device according to still another embodiment of the present disclosure.

The present disclosure further provides a communication device 300. The communication device 300 may be the coordinating device described in the foregoing embodiments. As shown in FIG. 10, the communication device 300 includes a processor 310 and a transceiver 320, and the processor 310 is connected to the transceiver 320. In one embodiment, the communication device 300 further includes a memory 330. The memory 330 is connected to both the processor 310 and the transceiver 320. Further, in one embodiment, the communication device 300 further includes a bus system 340. The processor 310, the transceiver 320, and the memory 330 may be connected by the bus system 340. The memory 330 may be configured to store an instruction, and the processor 310 is configured to execute the instruction stored in the memory 330, to control the transceiver 320 to receive and send signals. The memory 330 may be further configured to cache data generated when the processor 310 executes the instruction.

The processor 310 is configured to control the transceiver 320 to obtain a signal, and the processor 310 processes the signal obtained by the transceiver 320, to obtain transmission parameter information. For details, refer to the descriptions in operation S103. Details are not described herein again.

The processor 310 is further configured to control the transceiver 320 to receive a signal, and the processor 310 processes the signal received by the transceiver 320, to obtain to-be-transmitted data. For details, refer to the descriptions in operation S102. Details are not described herein again.

In one embodiment, the memory 330 may cache the transmission parameter information and the to-be-transmitted data. The processor 310 may further perform corresponding processing on the to-be-transmitted data before an initial transmission moment corresponding to the to-be-transmitted data arrives, to prepare for sending.

The processor 310 is further configured to: when the initial transmission moment corresponding to the to-be-transmitted data arrives, control, based on the transmission parameter information, the transceiver 320 to send the to-be-transmitted data to a network side device. For details, refer to the descriptions in operation S104. Details are not described herein again.

Further, the processor 310 is further configured to control the transceiver 320 to feed back first indication information to a target device. The first indication information indicates that the communication device 300 successfully obtains the transmission parameter information and the to-be-transmitted data. For details, refer to the related descriptions in operation S103. Details are not described herein again.

Further, the processor 310 is further configured to control the transceiver 320 to receive second indication information sent by the target device or the network side device. The second indication information indicates that the target device requests the communication device 300 to send the to-be-transmitted data to the network side device. For details, refer to the descriptions in the corresponding embodiments of the data transmission method. Details are not described herein again.

Further, the processor 310 is further configured to control the transceiver 320 to obtain third indication information fed back by the network side device for the to-be-transmitted data. The third indication information indicates that the network side device fails to receive the to-be-transmitted data. When a retransmission moment corresponding to the to-be-transmitted data arrives, the processor 310 is further configured to control the transceiver 320 to retransmit the received to-be-transmitted data to the network side device. For details, refer to the descriptions in operation S105 and operation S106. Details are not described herein again.

For details about other functions of the processor 310 and the transceiver 320, refer to the descriptions in the corresponding embodiments of the data transmission method. Details are not described herein again.

Figure 11:
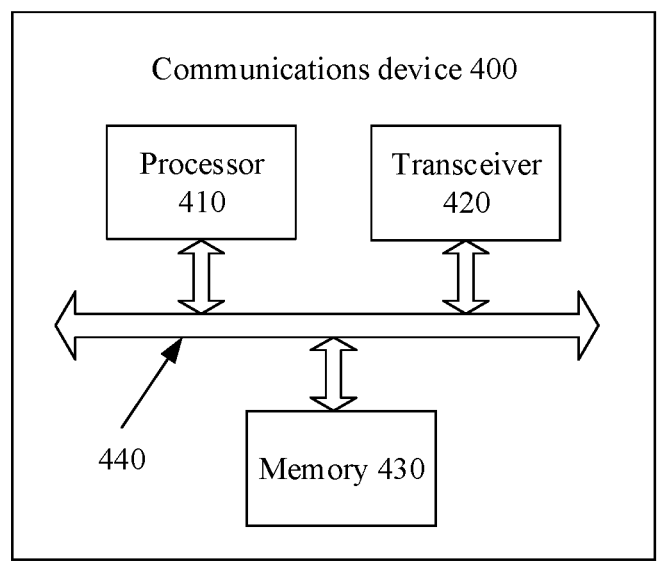
FIG. 11 is an example schematic structural diagram of hardware of a communication device according to yet another embodiment of the present disclosure.

The present disclosure further provides a communication device 400. The communication device 400 may be the target device described in the foregoing embodiments. As shown in FIG. 11, the communication device 400 includes a processor 410 and a transceiver 420, and the processor 410 is connected to the transceiver 420. In one embodiment, the communication device 400 further includes a memory 430. The memory 430 is connected to both the processor 410 and the transceiver 420. Further, in one embodiment, the communication device 400 further includes a bus system 440. The processor 410, the transceiver 420, and the memory 430 may be connected by the bus system 440. The memory 430 may be configured to store an instruction, and the processor 410 is configured to execute the instruction stored in the memory 430, to control the transceiver 420 to receive and send signals. The memory 430 may be further configured to cache data generated when the processor 410 executes the instruction.

The processor 410 is configured to determine to-be-transmitted data that needs to be sent to a network side device. For details, refer to the descriptions in operation S100. Details are not described herein again.

The processor 410 is further configured to: perform corresponding processing on the to-be-transmitted data before an initial transmission moment of sending the to-be-transmitted data to the network side device arrives, to prepare for sending; and control the transceiver 420 to send the to-be-transmitted data to a coordinating device. For details, refer to the descriptions in operation S101. Details are not described herein again.

In one embodiment, the memory 430 may cache the to-be-transmitted data.

Further, the processor 410 is further configured to: when the initial transmission moment arrives, control, based on transmission parameter information, the transceiver 420 to send the to-be-transmitted data to the network side device, where the transmission parameter information indicates a parameter that needs to be used by the communication device 400 to send the to-be-transmitted data to the network side device. For details, refer to the related descriptions in operation S107. Details are not described herein again.

Further, the processor 410 is further configured to control the transceiver 420 to receive the transmission parameter information sent by the network side device. Alternatively, the processor is further configured to determine the transmission parameter information. For details, refer to the related descriptions in operation S103. Details are not described herein again.

Further, the processor 410 is further configured to: before the initial transmission moment arrives, control the transceiver 420 to send the transmission parameter information to the coordinating device. For details, refer to the related descriptions in operation S103. Details are not described herein again.

Further, the processor 410 is further configured to: before the initial transmission moment arrives, if the communication device 400 receives no first indication information fed back by the coordinating device, control the transceiver 420 to retransmit the to-be-transmitted data to the coordinating device, and send the transmission parameter information to the coordinating device. The first indication information indicates that the coordinating device successfully obtains the transmission parameter information and the to-be-transmitted data. For details, refer to the related descriptions in operation S103. Details are not described herein again.

Further, the processor 410 is further configured to control the transceiver 420 to send second indication information to the coordinating device. The second indication information indicates that the communication device 400 requests the coordinating device to send the to-be-transmitted data to the network side device. For details, refer to the descriptions in the corresponding embodiments of the data transmission method. Details are not described herein again.

For details about other functions of the processor 410 and the transceiver 420, refer to the descriptions in the corresponding embodiments of the data transmission method. Details are not described herein again.

The present disclosure further provides a data transmission system. The data transmission system includes a network side device, and the communication device 300 and the communication device 400 described in the foregoing embodiments. For details, refer to the foregoing embodiments. Details are not described herein again.

All or some of the foregoing embodiments may be implemented through software, hardware, firmware, or any combination thereof. When software is used, all or some of the embodiments may be implemented in a form of a computer program product. The computer program product includes one or more computer instructions. When the computer program instructions are loaded and executed on a computer, all or some of the procedures or functions according to the embodiments of the present disclosure. The computer may be a general-purpose computer, a dedicated computer, a computer network, or other programmable apparatuses. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

To sum up, the foregoing descriptions are merely embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A data transmission method, comprising:
obtaining, by a coordinating device, transmission parameter information, wherein the transmission parameter information indicates a parameter that needs to be used by a target device to send to-be-transmitted data to a network side device;
receiving, by the coordinating device, the to-be-transmitted data sent by the target device; and
when an initial transmission moment of the to-be-transmitted data arrives, sending, by the coordinating device, the received to-be-transmitted data to the network side device based on the transmission parameter information, wherein the initial transmission moment includes a time when the to-be-transmitted data is to be transmitted from the target device to the network side device for a first time without a retransmission.

2. The method according to claim 1, wherein the obtaining, by a coordinating device, transmission parameter information comprises:
listening, by the coordinating device, to information sent by the network side device to the target device, to obtain the transmission parameter information; or
receiving, by the coordinating device, the transmission parameter information sent by the target device.

3. The method according to claim 1, wherein the receiving, by the coordinating device, the to-be-transmitted data sent by the target device comprises: receiving, by the coordinating device through a device to device (D2D) link between the coordinating device and the target device, the to-be-transmitted data sent by the target device.

4. The method according to claim 1, further comprising: feeding back, by the coordinating device, first indication information to the target device, wherein the first indication information indicates that the coordinating device successfully obtains the transmission parameter information and the to-be-transmitted data.

5. The method according to claim 1, further comprising: receiving, by the coordinating device, second indication information sent by the target device or the network side device, wherein the second indication information indicates that the target device requests the coordinating device to send the to-be-transmitted data to the network side device.

6. The method according to claim 1, wherein the transmission parameter information comprises at least one of time-frequency resource information, spatial domain resource information, code domain resource information, uplink pilot resource information, uplink power control information, modulation and coding scheme information, or retransmission mechanism information.

7. A data transmission method, comprising:
determining, by a target device, to-be-transmitted data that needs to be sent to a network side device; and
before an initial transmission moment at which the target device sends the to-be-transmitted data to the network side device arrives, sending, by the target device, the to-be-transmitted data to a coordinating device, wherein the initial transmission moment includes a time when the to-be-transmitted data is to be transmitted from the coordinating device and the target device simultaneously to the network side device for a first time without a retransmission.

8. The method according to claim 7, further comprising: when the initial transmission moment arrives, sending, by the target device, the to-be-transmitted data to the network side device based on transmission parameter information, wherein the transmission parameter information indicates a parameter that needs to be used by the target device to send the to-be-transmitted data to the network side device.

9. The method according to claim 8, further comprising:
receiving, by the target device, the transmission parameter information sent by the network side device; or
determining, by the target device, the transmission parameter information.

10. The method according to claim 8, further comprising:
sending, by the target device, the transmission parameter information to the coordinating device before the initial transmission moment arrives.

11. The method according to claim 7, wherein sending, by the target device, the to-be-transmitted data to a coordinating device comprises: sending, by the target device, the to-be-transmitted data to the coordinating device through a device to device (D2D) link between the target device and the coordinating device.

12. The method according to claim 7, further comprising:
before the initial transmission moment arrives, if the target device receives no first indication information fed back by the coordinating device, retransmitting, by the target device, the to-be-transmitted data to the coordinating device and sending transmission parameter information to the coordinating device, wherein
the first indication information indicates that the coordinating device successfully obtains the transmission parameter information and the to-be-transmitted data.

13. The method according to claim 7, further comprising: sending, by the target device, second indication information to the coordinating device, wherein the second indication information indicates that the target device requests the coordinating device to send the to-be-transmitted data to the network side device.

14. The method according to claim 8, wherein the transmission parameter information comprises at least one of time-frequency resource information, spatial domain resource information, code domain resource information, uplink pilot resource information, uplink power control information, modulation and coding scheme information, and retransmission mechanism information.

15. A communication device, comprising:
a transceiver;
wherein the transceiver is configured to obtain transmission parameter information, wherein the transmission parameter information indicates a parameter that needs to be used by a target device to send to-be-transmitted data to a network side device;
wherein the transceiver is configured to receive the to-be-transmitted data sent by the target device; and
wherein the transceiver is configured to send the received to-be-transmitted data to the network side device based on the transmission parameter information when an initial transmission moment of the to-be-transmitted data arrives, wherein the initial transmission moment includes a time when the to-be-transmitted data is to be transmitted from the target device to the network side device for a first time without a retransmission.

16. The communication device according to claim 15, wherein the transceiver is specifically configured to listen to information sent by the network side device to the target device, to obtain the transmission parameter information; or the transceiver is specifically configured to receive the transmission parameter information sent by the target device.

17. The communication device according to claim 15, wherein the transceiver is specifically configured to receive, through a device to device (D2D) link between the communication device and the target device, the to-be-transmitted data sent by the target device.

18. A communication device, comprising:
a processor and a transceiver;
wherein the processor is configured to determine to-be-transmitted data that needs to be sent to a network side device; and
wherein the transceiver is configured to send the to-be-transmitted data to a coordinating device before an initial transmission moment of sending the to-be-transmitted data to the network side device arrives, wherein the initial transmission moment includes a time when the to-be-transmitted data is to be transmitted from the coordinating device and a target device simultaneously to the network side device for a first time without a retransmission.

19. The communication device according to claim 18, wherein the transceiver is further configured to send the to-be-transmitted data to the network side device based on transmission parameter information when the initial transmission moment arrives, wherein the transmission parameter information indicates a parameter that needs to be used by the communication device to send the to-be-transmitted data to the network side device.

20. The communication device according to claim 18, wherein the transceiver is further configured to receive transmission parameter information sent by the network side device, or the processor is further configured to determine the transmission parameter information.

* * * * *